United States Patent [19]

Oscarsson et al.

[11] 4,184,962
[45] Jan. 22, 1980

[54] TOTALLY WRAPPED COIL PERMEATION DEVICE AND ARTIFICIAL KIDNEY

[75] Inventors: Rolf A. Oscarsson, Pedricktown, N.J.; Albert E. Moore, Mainland, Pa.

[73] Assignee: Extracorporeal Medical Specialties, Inc., Pa.

[21] Appl. No.: 917,083

[22] Filed: Jun. 19, 1978

Related U.S. Application Data

[63] Continuation-in-part of Ser. No. 842,044, Oct. 14, 1977, abandoned.

[51] Int. Cl.² .............................................. B01D 31/00
[52] U.S. Cl. ................. 210/232; 210/321 B; 210/487; 210/494 M
[58] Field of Search ...................... 210/22, 321 B, 487, 210/494 M, 494 R, 232; 23/258.5 M; 128/214 R

[56] References Cited

U.S. PATENT DOCUMENTS

| 3,729,098 | 4/1973 | Serur ................................. 210/321 B |
| 3,738,813 | 6/1973 | Esmond ....................... 210/321 B X |

FOREIGN PATENT DOCUMENTS 2339843  2/1974  Fed. Rep. of Germany ....... 210/321 B

*Primary Examiner*—Frank A. Spear, Jr.

[57] ABSTRACT

A wrapped coil-type permeation device wherein the support material has integrally formed therein thickened side strips and end areas suitable for creating a winding core upon which membrane and support material windings are layered and/or an outer covering or casing for the wound coil device. The support material end areas include interlocking portions and fluid ports.

13 Claims, 15 Drawing Figures

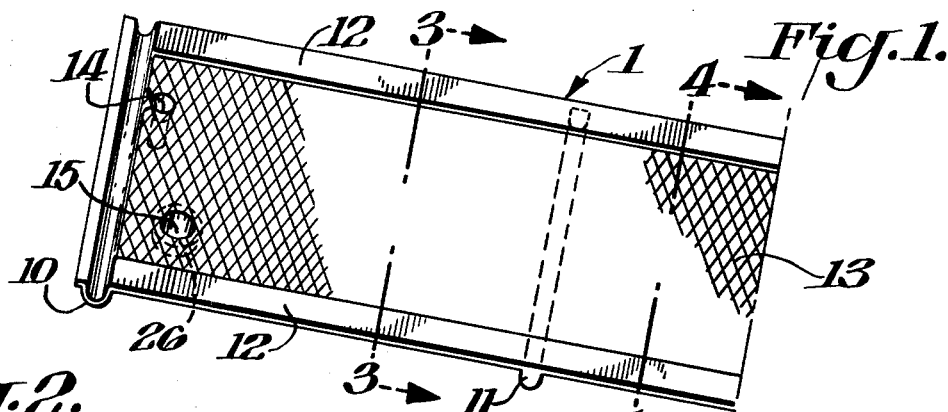
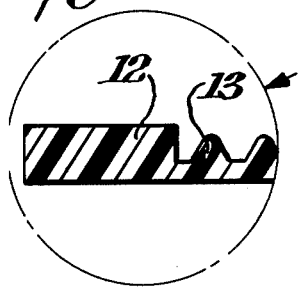  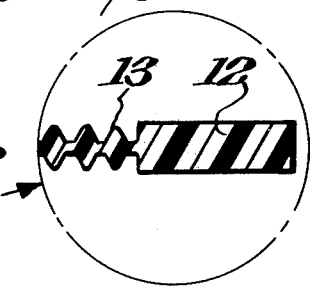
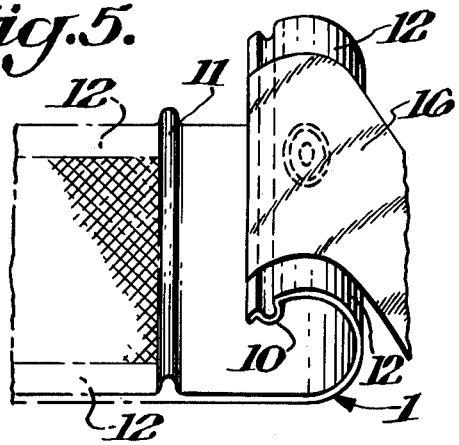 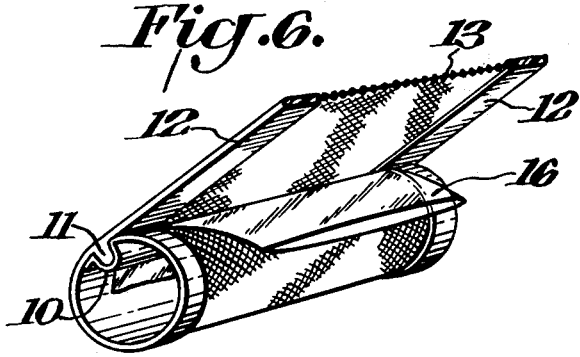
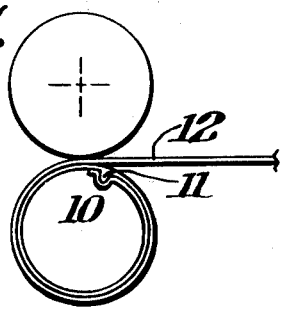 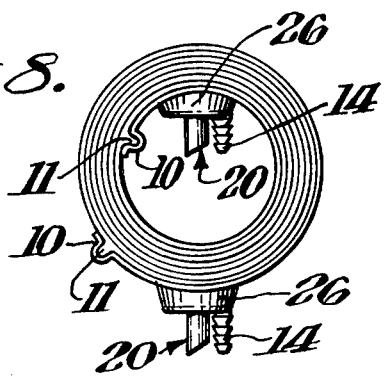

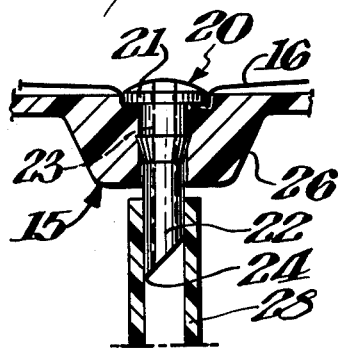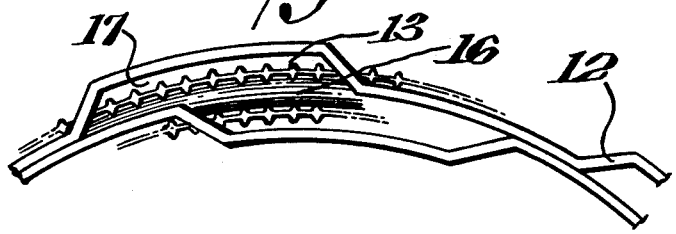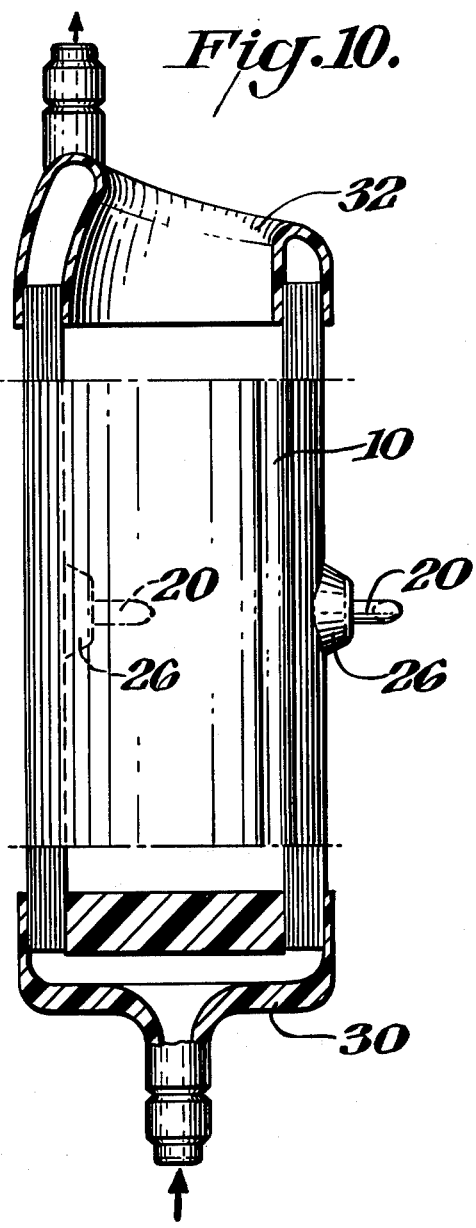

TOTALLY WRAPPED COIL PERMEATION DEVICE AND ARTIFICIAL KIDNEY

CROSS REFERENCE TO RELATED APPLICATIONS

This is a continuation-in-part of our application Ser. No. 842,044 filed Oct. 14, 1977, now abandoned.

BACKGROUND OF THE INVENTION

The present invention relates to an improvement in the construction of permeation devices in general and, more particularly, to coil-type dialyzers used in artificial kidney systems. Although the description of the invention herein is based on its use as a dialyzer of the type used in artificial kidneys it may also be used in other mass transfer applications.

Numerous coil artificial kidney devices are known which comprise a flattened tubular semipermeable membrane wound about a rigid pre-formed core member with the membrane winding layers being separated by membrane support material. Additional components of such coil dialyzers include a cylindrical outer case, upper and lower end caps for the cylindrical case, inlet and outlet ports for blood flow, and inlet and outlet ports for dialysis solution flow. Examples of such coil kidneys are disclosed in Miller U.S. Pat. No. 3,508,662, van Assendelft U.S. Pat. No. 3,892,664 and Miller U.S. Pat. No. 4,009,108.

In operation coil dialyzers may be either totally enclosed or partially enclosed. In both types blood to be dialyzed flows through the interior of the wound flattened tubular semipermeable membrane while a dialyzing fluid flows over the outer surface of the membrane thereby removing blood impurities which have passed through the semipermeable membrane. The totally enclosed coil dialyzer has integral ports for introducing and removing dialyzing fluid and blood. All fluids are contained or enclosed in the dialyzer itself. By contrast, the partially enclosed coil dialyzer sits in a bath of dialyzing fluid and the circulation of the fluid in the bath causes dialyzing fluid to flow between the windings of the semipermeable membrane and thereby remove blood impurities which have migrated to the exterior of the membrane. A partially enclosed coil dialyzer is disclosed in the Miller U.S. Pat. No. 3,508,662.

SUMMARY OF THE INVENTION

This invention provides a coil-type permeation device for use in an artificial kidney which has a simpler, more economical construction utilizing a minimum of parts which may be assembled faster than most coil type units now on the market.

By the unique construction of the membrane support material and its integral side and end parts the need for a separate winding core and/or a separate outer casing may be eliminated. At one end of the membrane support material spaced interlocking members are provided so that when the first end of the support material is coiled into a cylindrical shape these members interlock to form the core of the dialyzer. The open end of the tubular membrane is placed between the interlocking members to seal that end of the membrane. Before this seal is effectuated, however, the novel piercing stopper of this invention is pushed through the membrane material and into locking engagement with a mating blood port in the support material to provide for blood flow through the interior of the tubular membrane material.

Along the length of the support material, the side edges thereof are thicker than the inner support area. As winding of the tubular membrane and the support material continues, the thicker side edges of the support material provide spacing between the plural windings which permits a precisely defined area for blood and dialysis flow in each individual winding.

When the entire support material and the accompanying membrane are wound, the trailing end of the support material is provided with suitable interlocks spaced so that the final layer of support material forms the outer covering for the coil kidney. The trailing end of the membrane tubing is sealed in this interlock.

Because the thickened edges of the support material may be heat sealed or cemented to the preceding layer, the need for end caps on the coil kidney may be eliminated. Throughout most of the length of the support material, both sides of the area between the thickened edges are embossed to form a roughened surface in order to promote fluid flow. However, some areas are blanked out, made thicker, provided with flow paths and provided with fluid port means. For example, the area between the first set of male and female nips which forms the winding core is thicker than the major portion of the support material and is only embossed on the one side facing the subsequent windings. Also in this first core winding area, ports for blood and dialysis fluid may be provided. When the final wrap of the support material is reached, it is similarly thickened and embossed only on the one side facing the windings on the core so that the external casing may be formed. The final winding or wrap may also be provided with blood and dialysis fluid ports.

Another embodiment of this invention provides for a partially enclosed coil dialyzer. In this embodiment thickened side edges of the support material are of a nonuniform, zig-zag configuration so that the top and bottom of the wrapped coil dialyzer contain openings for flow of dialysate therethrough required for partially enclosed operation.

In another embodiment of this invention only one end of the support material is integrated into that material to form a core or casing. For example, the core may be formed from an integral end part of the support material as in the previous embodiment and then placed in a conventional outer casing with suitable fluid ports and membrane seals viz. as shown in the Miller U.S. Pat. No. 4,009,108. Conversely, a conventional core can be used with an integrated outer casing, in accordance with the previous embodiment.

BRIEF DESCRIPTION OF THE DRAWINGS

Further advantages of the coil kidney of this invention will become apparent to those of ordinary skill in the art from the detailed description in conjunction with the drawings wherein:

FIG. 1 is a pictorial view of the trailing end portion of the support material used to form the outside casing of the coil dialyzer;

FIG. 2 is a side view of the support material of FIG. 1 with membrane tubing in place;

FIG. 3 is a cross-sectional view along lines 3—3 of FIG. 1;

FIG. 3A is an enlarged cross sectional view of a portion of the support material shown in FIG. 3;

FIG. 4 is a cross-sectional view along lines 4—4 of FIG. 1;

FIG. 4A is an enlarged view of a portion of FIG. 4.

FIG. 5 is a pictorial view of the leading end portion of the support material used to form the dialyzer core with membrane in place;

FIG. 6 is a pictorial view illustrating the support material and interlocks used to form the core and seal the membrane tubing;

FIG. 7 illustrates a means for heat sealing the thickened side edges of the support material;

FIG. 8 is an end elevational view of the completed totally enclosed dialyzer embodiment of this invention;

FIG. 9 is a partial cross-sectional view of the piercing stopper button of this invention;

FIG. 10 is a side elevational view having portions broken away of another embodiment of the dialyzer utilizing end caps to channel flow of dialysate through the dialyzer;

FIG. 11 is a fragmental view of the end of the partially enclosed dialyzer of this invention.

DETAILED DESCRIPTION

Figure 12:
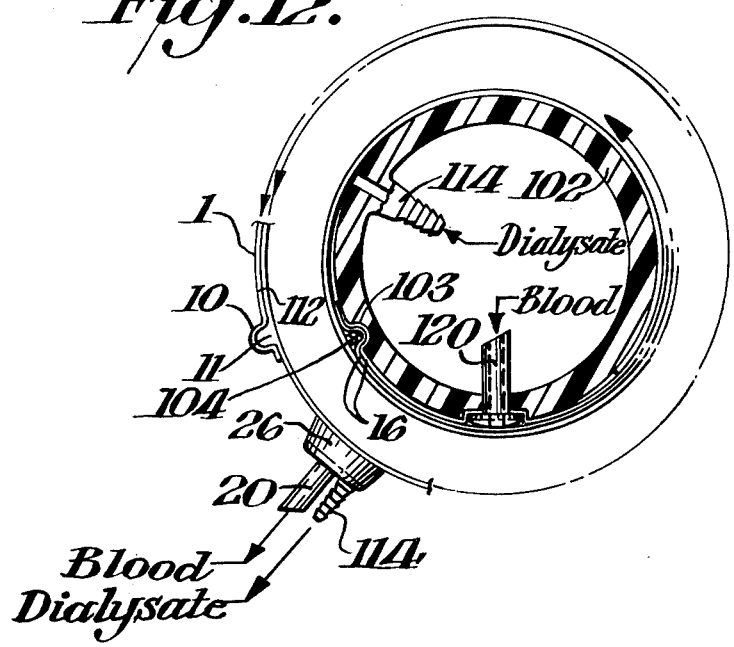
FIG. 12 is a cross-sectional top plan view of an alternate embodiment of this invention in which the support material of this invention is used in conjunction with a separate core.

The support material of the present invention has an elongated rectangular shape. In the main embodiment of this invention each end of the support material has trough-shaped femeale nips 10 or similar interlocks integrally formed therein. Parallel to the female nips and spaced therefrom are ridge shaped male nips 11. The distance between nips 10 and 11 corresponds to the circumference of the cylinder formed when the nips interlock. In the area between the male and female nips access ports may be provided for blood and/or dialysate flow through the dialyzer. The edges 12 of the support material 1 are thicker than the interior area 13 and thus when the support material 1 is wrapped in a cylindrical shape, one layer upon the other, the thickened side sections 12 form top and bottom end caps for the dialysis unit. The remaining interior area 13 of the support material 1 is embossed with a design which facilitates fluid flow in and around the tubular membrane 16 when it is wound with the support material 1. Preferably, only one side of the area between the male and female nips is embossed as shown in FIG. 3 so that the "core" and outer covering formed when the nips interlock will be thicker and have a smooth surface with a more rigid characteristic. Of course, the area between the two male nips would be embossed on both sides as illustrated in FIG. 4.

Construction of the totally enclosed embodiment of the coil dialyzer of the present invention proceeds by first aligning the membrane tubing 16 along the length of support material between the thickened sides 12. To permit introduction of blood into the permeable tubing 16 the piercing stopper button 20 is pushed through the side of tubing 16 closest to the support material 1. The stopper button 20 comprises a cap 21 and stem 22 with a bore 23 therethrough. The leading edge of the stem 22 is cut at an angle which creates a sharp tip 24 capable of piercing the tough but easily torm permeable membrane 16 without ripping that material. This avoids the problems associated with the prior art devices where a hole had to be mechanically punched through the membrane tubing before a connector could be inserted through it.

Once the stopper button 20 is through the membrane 16 it is placed in a mating seat 26 formed in the support material as part of the blood port 15. As shown in FIG. 9 seat 26 is designed to retain stopper buttom 20 once inserted, for example, by a suitable interaction of lip and recess on the button 20 and seat 26, respectively. This interaction also firmly holds the permeable membrane 16 in place between the cap 21 and seat 26 preventing leakage. The stem 22 of the stopper button 20 extends beyond the lower edge of seat 26 to facilitate connection thereto of external blood tubing 28 linked to the patient undergoing dialysis. Inlet and outlet ports 14 formed in support material 1 are connected in the usual manner to dialysate.

As illustrated in FIG. 2, the end of the permeable membrane 16 overhangs the female nip 10 so that when the male and female nips interlock, the membrane end is sealed therebetween. The membrane 16 and support material 1 are then coiled into a cylindrical shape as shown in FIG. 5. When the male 11 and female 10 nips interlock, a "core" cylinder is formed upon which further wrappings can be made as illustrated in FIG. 6. The membrane 16 and its support material 16 are wrapped around the thus formed "core" cylinder in a "jelly-roll" fashion until the desired number of layers for the dialysis unit are formed. As shown in FIG. 7, the thickened support material side edges 12 may be heat sealed or cemented to one another forming rigid end seals for the dialyzer; thus, the need for separate end caps used on prior art units are totally eliminated.

The last wrap layer of the support material 1 forms the outer casing of the dialyzer. Except for the larger distance between the male and female nips, which distance corresponds to the outer circumference of the wrapped dialyzer, the portion of the membrane support material 1 forming the outer casing is similar to the portion forming the core. Thus as with the "core" forming end of the support material, the outer casing forming end is embossed on only one side between the nips so that a smooth rigid outer wall is formed (FIGS. 1 and 3). Also between the nips, dialysis and blood fluid flow ports 14 and 15 similar to those in the core are provided. The same piercing button stopper 20 described above is used in the blood port 15. When the male and female nips interlock forming the outer casing, the dialysis membrane 16 end is clamped therebetween thus sealing the membrane end. The final construction is illustrated in FIG. 8.

In operation the totally wrapped coil dialyzer of this invention performs the same as coil dialyzers of which those skilled in the art are fully aware.

The above described construction relates to the totally enclosed-type coil dialyzer. A unique feature of this invention is that a partially enclosed dialyzer may also be constructed using the novel techniques outlined above. To fabricate the partially enclosed coil dialyzer the support material side edges 12 are provided with a non-planar pattern of varying thickness or the side edge surface 12 may be of uniform thickness but non-planar. Such patterns of varying thicknesses may take the form of a sine wave, a saw tooth configuration, or any other convenient shape for example as illustrated in FIG. 11. The pattern causing varying thickness may be provided, however, on only one side of the side edges; it will be appreciated by those in the art that the same or a different pattern may be provided on the opposite side. Furthermore, the configuration of the side sections may be of a uniform thickness but having a corrugated configuration resulting in a non-planar side edge surface.

It will be appreciated by those skilled in the art that when a membrane support having a side edge 12 configuration of irregular surface configuration or varying thickness is employed to construct the totally wrapped coil dialyzer of this invention, the resulting end seals forming the integral end caps of the coil dialyzer will have openings 17 between the winding layers of the wound support side sections. Those openings 17 permit the flow of dialyzing fluid around the dialysis membrane of the coil kidney and longitudinally through the coil kidney when partially enclosed operation is desired. Thus, in operation the partially enclosed coil dialyzer operates in similar manner to the totally enclosed dialyzer with the exception that one fluid flow is generally along the longitudinal axis of the coil dialyzer rather than both following spiral paths around the coil winding as in the totally enclosed embodiment described above.

The coil dialyzer of the present invention has still further advantages in that partially enclosed embodiment just described can be easily converted to a totally enclosed embodiment with the addition of end caps 30 and 32 to channel dialysate through the dialyzer cross-current to the spiral flow of blood therethrough (See FIG. 10). In this embodiment dialysate enters end cap 30 and is channeled through appropriate circumferential porting therein in order to pass through openings 17 in the side edges 12 of the wrapped support material 1. The dialysate then flows across the spirally wrapped tubing 16 containing blood and exits from end cap 32 containing suitable internal circumferential porting similar to that in end cap 30.

Figure 13:
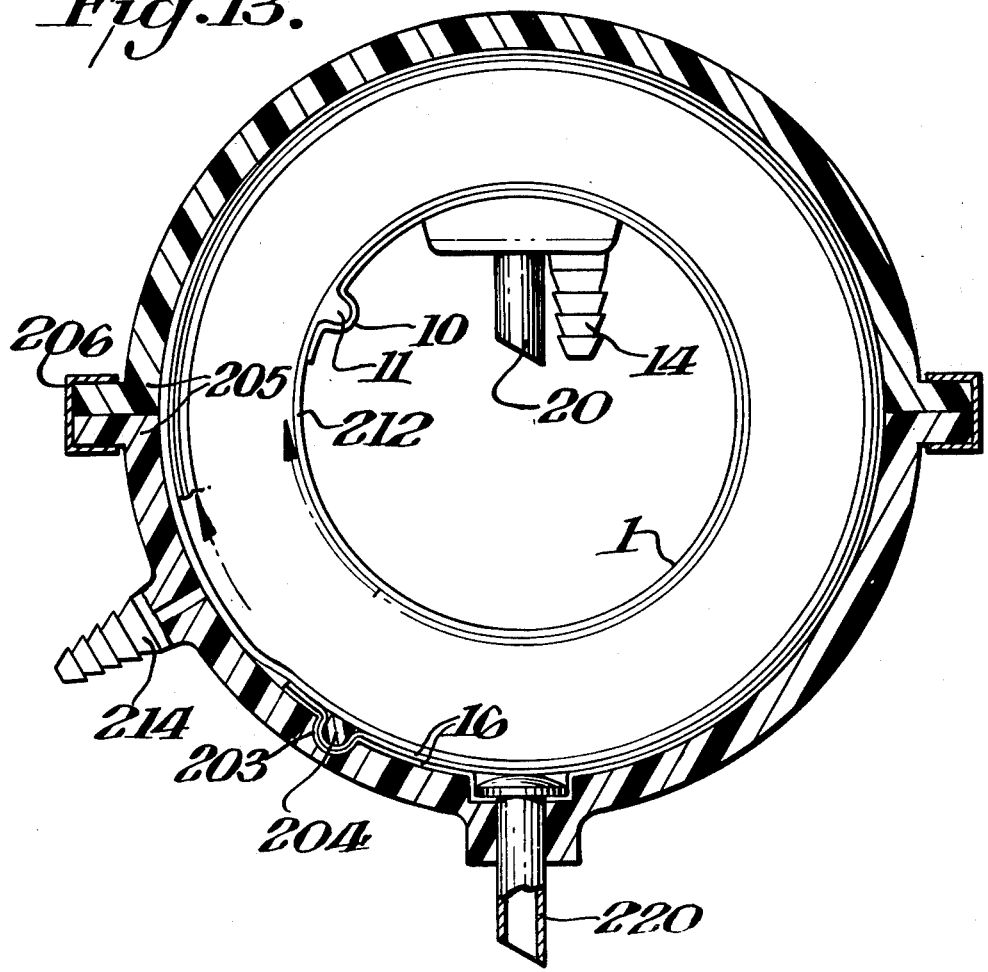
FIG. 13 is a cross-sectional top plan view of an embodiment of this invention in which the support material of this invention is used in conjunction with a separate outer casing.

In the alternate embodiment illustrated in FIGS. 12 and 13 only one end of the support material 1 is integrated into a core or outer casing. For example, in the embodiment illustrated in FIG. 12 the support material 1 with only one integral end is wrapped on a separate cylindrical core 102. To seal the end of permeable membrane tubing 16 closest to core 102 it is placed in a suitable channel 103 formed along the length of core 102 and held in place by a suitable detent or nip 104. This relationship of channel 103 and detent 104 is similar to the nips 10 and 11 of the previous embodiment. Dialysate and blood ports 114 and 120 in the core 102 are similar to those of previous embodiments.

To complete the dialyzer of this embodiment support material 1 is spirally wrapped around the core 102 and the edges 12 suitably sealed to the core 102 and to each other in succeeding layers in the manner previously described. The assembly is completed by snapping nips 10 and 11 together with the permeable membrane 16 sealed therebetween.

The flow of blood and dialysate through the assembled dialyzer may be concurrent as illustrated in FIG. 12, countercurrent, or cross current such as illustrated in FIG. 10.

The assembly of the embodiment of FIG. 13 is similar to that of FIG. 12 except that the integral end of the support material 1 in this embodiment forms the core rather than outer casing. In this embodiment, after forming the integral core by interlocking nips 10 and 11 and subsequent wrapping with interleaved permeable tubing 16 to form the body of the dialyzer, this assembly is placed in mating halves of an outer casing 205 containing suitable dialysate and blood porting 214 and 220, respectively. The casing halves 205 are held in sealing engagement with clamps 206 or may be glued, welded or the like. Sealing of the outer end of permeable tubing 16 is accomplished by suitable interlocks 203 and 204 of the kind previously described.

What we claim is:

1. A totally wrapped coil dialyzer comprising fluid inlet and outlet ports, a tubular permeable membrane and a one-piece membrane support material having an embossed area surrounded by first and second end sections and thickened edge strips where the first end section is provided with interlock means for forming the core of the coil dialyzer and the second end section is provided with interlock means for forming the outer casing of the coil dialyzer when the support material is spirally wrapped upon itself.

2. The coil dialyzer of claim 1 wherein at least one end of the tubular membrane is sealed by placement between mating portions of the interlock means on the support material.

3. The coil dialyzer of claim 1 wherein the interlock means comprise mating male and female nips formed on the support material.

4. The coil dialyzer of claim 1 wherein the spirally wrapped support material forms a cylinder, the ends of the cylinder being formed by the thickened edge strips of the support material sealed together.

5. The coil dialyzer of claim 4 wherein the surface of the thickened edge strips of the support material are non-planar to facilitate passage of fluid through the ends of the cylindrical dialyzer.

6. The coil dialyzer of claim 1 wherein at least one set of inlet and outlet ports is located in the said first and second end sections of said membrane support material.

7. The coil dialyzer of claim 6, wherein the inlet and outlet ports comprise a seat formed in the support material adapted to receive a piercing stopper button, said button containing a cap and stem with bore therethrough, the leading edge of the stem being angled and terminating in a sharpened point to facilitate penetration of the permeable membrane by the button without tearing said membrane.

8. A coil permeation device comprising fluid inlet and outlet ports, flattened tubular permeable membrane material in fluid communication with at least some of said ports, a one-piece elongated membrane support material having a patterned area over a substantial length thereof, at least one end of said support material containing interlock means formed therein whereby the core of the permeation device is formed by coaction of the interlock means when the membrane support material is spirally wrapped upon itself, and a separate outer casing surrounding the wrapped support material and permeable membrane.

9. The coil dialyzer of claim 8 wherein the interlock means seal at least one end of the permeable membrane when the support material is spirally wrapped upon itself.

10. The coil dialyzer of claim 8 wherein the support material has edge strips along the lengthwise edges thereof which are thicker than the patterned area lying between at least a portion of said edge strips.

11. A coil permeation device comprising fluid inlet and outlet ports, flattened tubular permeable membrane material in fluid communication with at least some of said ports, a one-piece elongated membrane support material having a patterned area over a substantial length thereof, at least one end of said support material containing interlock means formed therein whereby the casing of the permeation device is formed by coaction of the interlock means when the membrane support material is spirally wrapped upon itself, and a separate core about which the support material is wrapped.

12. The coil dialyzer of claim 11 wherein the interlock means seal at least one end of the permeable membrane when the support material is spirally wrapped upon itself.

13. The coil dialyzer of claim 11 wherein the support material has edge strips along the lengthwise edges thereof which are thicker than the patterned area lying between at least a portion of said edge strips.

* * * * *

UNITED STATES PATENT AND TRADEMARK OFFICE
CERTIFICATE OF CORRECTION

PATENT NO. : 4,184,962
DATED : January 22, 1980
INVENTOR(S) : Rolf A. Oscarsson and Albert E. Moore It is certified that error appears in the above-identified patent and that said Letters Patent are hereby corrected as shown below:

On the cover page, item [73] Assignee: should read
--Extracorporeal Medical Specialties, Inc. , a part interest --

Col. 3, line 35 : "femeale" should be --female--
Col. 3, line 68 : "torm" should be --torn--
Col. 4, line 8 : "buttom" should be --button--
Col. 4, line 62 : "thickness" should be --thicknesses--

Signed and Sealed this

Tenth Day of June 1980

[SEAL]

Attest:

SIDNEY A. DIAMOND

Attesting Officer

Commissioner of Patents and Trademark